(12) United States Patent
Bodenstein

(10) Patent No.: US 12,307,016 B2
(45) Date of Patent: May 20, 2025

(54) OPERATING MEMBER WITH A HAPTIC FEEDBACK THAT IS LIMITED IN AN IMPROVED MANNER TO THE ACTUATION SURFACE

(71) Applicant: Preh GmbH, Bad Neustadt a.d. Saale (DE)

(72) Inventor: Tobias Bodenstein, Salz (DE)

(73) Assignee: Preh GmbH, Bad Neustadt a.d. Saale (DE)

( * ) Notice: Subject to any disclaimer, the term of this patent is extended or adjusted under 35 U.S.C. 154(b) by 140 days.

(21) Appl. No.: 18/453,857

(22) Filed: Aug. 22, 2023

(65) Prior Publication Data

US 2024/0118750 A1    Apr. 11, 2024

(30) Foreign Application Priority Data

Oct. 7, 2022 (EP) .................................. 22200361

(51) Int. Cl.
  *G06F 3/01* (2006.01)
  *G06F 3/041* (2006.01)
(52) U.S. Cl.
  CPC ............. *G06F 3/016* (2013.01); *G06F 3/041* (2013.01)
(58) Field of Classification Search
  CPC ......... G06F 3/016; G06F 3/041; B60K 35/25; B60K 2360/1446; B60K 35/10; B60R 11/00; B60R 16/02; B60R 2011/0003
  See application file for complete search history.

(56) References Cited

U.S. PATENT DOCUMENTS

| | | |
|---|---|---|
| 2010/0079264 A1 | 4/2010 | Hoellwarth |
| 2014/0139328 A1* | 5/2014 | Zellers ................. G06F 3/041 340/407.2 |
| 2017/0021762 A1* | 1/2017 | Daman ................. B60K 35/10 |

FOREIGN PATENT DOCUMENTS

| | | |
|---|---|---|
| DE | 102020120711 A1 | 2/2022 |
| WO | 2022178799 A1 | 9/2022 |

OTHER PUBLICATIONS

European Search Report for 22200361.8 dated Mar. 15, 2023. European Patent Office, Munich, Germany.

* cited by examiner

*Primary Examiner* — Joseph H Feild
*Assistant Examiner* — Sharmin Akhter
(74) *Attorney, Agent, or Firm* — M&B IP Analysts, LLC

(57) ABSTRACT

The present disclosure relates to an operating member including a carrier; an actuation part; and an actuation portion surrounded by a flexible insulation portion, wherein the actuation portion can vibrate relative to the carrier; detection means detecting a touch on the actuation surface and/or an actuation of the actuation part; an actuator fixed on the actuation portion of the actuation part, wherein an electrical excitation signal is applied by the detection means during a positive detection of an actuation or touch; wherein a dynamic rigidity of the actuation part determined along a measurement section with a maximum length of 1 cm, located on the visible surface, varies such that a first transfer function determined at a beginning of the measurement section, for a continuous frequency range between 30 and 1,000 Hz, differs from a second transfer function determined at an end of the measurement section for the same frequency range.

20 Claims, 2 Drawing Sheets

OPERATING MEMBER WITH A HAPTIC FEEDBACK THAT IS LIMITED IN AN IMPROVED MANNER TO THE ACTUATION SURFACE

The present disclosure relates to an operating member with an actuation part having an actuation surface for an operator to perform an operating input. A detection means is assigned to the actuating part, in order to detect a touch or an actuation of the actuation part that exceeds a touch. An actuation is understood to be a displacement of the actuation part under the influence of an actuating force that is applied by an operator and acts on the actuation surface. For this purpose, the actuation part is generally supported on a carrier in a manner capable of elastic vibration, in order to enable, on the one hand, a displacement for actuation, but also an excitation of vibration of the actuation part. To cause a forced vibration, or at least a deflection, a so-called active haptic feedback, for haptically confirming or acknowledging the touch or actuation that has occurred prior, an actuator is provided to which an electrical control signal can be applied. In general, there is the problem that the generated excitation of vibrations is not limited to the actuation surface and the generated vibration propagates further across the actuation part, e.g., as structure-borne noise. This has several disadvantages; on the one hand, there is the desire to limit the haptic feedback to the actuation surface in order thus to create a unique association with the respective actuation surface for the operator. This is advantageous particularly in the case of extensive surfaces in which the actuation surface constitutes only a fraction of the surface, or if several actuation surfaces are provided and the limitation of the haptic feedback to the respective region serves for the haptic orientation on the surface by the operator. There is also the problem that the structure-borne noise propagating in an undamped manner may contribute to an unwanted generation of noise, such as, for example, in the fastening structure outside the operating member; but the secondary noise generated by the structure-borne noise may also pose a problem.

Against this background, there was a need for a solution for an operating member with a vibration-capable actuation part for generating an active haptic feedback, in which the active haptic feedback is limited in an improved manner to the actuation surface and the operating member can be realized with a simple design and in a weight-saving manner. This object is achieved with an operating member according to claim 1. An equally advantageous use is the subject matter of the independent claim. Advantageous embodiments are in each case the subject matter of the dependent claims. It must be noted that the features cited individually in the claims can be combined with each other in any technologically meaningful manner and represent other embodiments. The description, in particular in connection with the figures, additionally characterizes and specifies the disclosed embodiments.

The present disclosure relates to an operating member. The term "operating member" is to be interpreted broadly and serves for performing an operating input by means of a movable actuation part within the context of a man-machine interface.

The operating member according to the disclosed embodiments includes a carrier. The term "carrier" is to be interpreted broadly and denotes, for instance, a component which serves for fixing the actuation part to a supporting structure or is indirectly or directly fixed, for example, to a motor vehicle component. For example, the carrier is configured as a housing. For example, the carrier is not visible to the operator if the operating member is attached as intended. For example, the carrier is formed from a plastic, a metal or a metallic alloy, such as ZAMAK, or combinations thereof.

The operating member according to the disclosed embodiment further has an actuation part, which is supported on the carrier and which forms a visible surface facing towards an operator that forms at least one insular actuation surface within the visible surface, wherein the actuation surface is formed by a cantilevered actuation portion of the actuation part; and the actuation portion is surrounded by an insulation portion of the actuation part, which is more flexible compared to the actuation portion, so that the actuation portion is supported so as to be capable of vibrating relative to the carrier, particularly in the direction perpendicular to the actuation surface. An "insular" arrangement of the actuation surface within the visible surface is also understood to be such an arrangement in which an edge of the actuation surface partially coincides with an outer boundary of the visible surface, i.e., the "insular" arrangement does not necessarily require a placement in entirety in the interior of the visible surface. Preferably, however, it is provided that the actuation surface is spaced apart from the outer boundary of the visible surface.

According to the disclosed embodiments, the operating member has detection means for detecting a touch on the actuation surface and/or for detecting an actuation of the actuation part. For example, a capacitive touch sensor system for detecting the touch or a resistive, capacitive, inductive or optical force sensor for detecting an actuation of the actuation part is provided. Preferably, the force sensor is a contactlessly working sensor, i.e., the cantilevered actuation surface is not supported on the carrier part via the force sensor.

According to the disclosed embodiments, there is further provided an actuator that, from the point of view of the operator, is fixed on the actuation portion underneath the actuation portion or on the side thereof that faces away from the operator, to which an electrical excitation signal is applied by the detection means in case of a positive detection of an actuation or touch, in order to excite a vibration of the actuation portion for a haptic feedback. The actuator is an active actuator, i.e. an actuator which can be triggered by an electrical excitation signal provided by detection means, and which, due to the application of a pulse, such as an impact, or the application of a vibration to actuation portion of the actuation part, is capable of exciting a deflection or vibration in the latter, which is haptically perceptible by the operator via the finger resting on the actuation surface. For example, this haptic perception serves as a confirmation signal for an executed touch or actuation, or as a haptic acknowledgement of a switching or controlling input that was performed. Preferably, the actuator is an inertia-based, motor-based actuator, such as a motor on whose rotating drive shaft a mass is mounted eccentrically with respect to its center of gravity, or a magnetic coil actuator, or a piezoelectric actuator, or a linear wide-band actuator, such as a voice coil actuator or a linear resonance actuator. Preferably, the actuator is fixed exclusively to the actuation part, e.g. by screwing or gluing.

According to the present disclosure, the dynamic rigidity, which is understood to be the local quotient of a local dynamic modulus of elasticity and the local thickness of the actuation part, varies along a measurement section with a maximum length of 1 cm, which leads from the actuation portion in or through the insulation portion and is located on the visible surface, such that a first transfer function determined at a beginning of the measurement section located within the actuation surface differs, for a continuous frequency range between 30 Hertz (Hz) and 1,000 Hz, by at least 5 decibel (dB), preferably at least 10 dB, from a second transfer function determined at an end of the measurement section located outside the actuation surface for the same frequency range. For example, the end is located within an insulation surface associated with the insulation portion, e.g., at the outer edge thereof farthest from the actuation surface. For example, the transfer function is determined for an electrical excitation signal, which is the same in each case, bandwidth-limited to 10 Hz to 4,000 Hz, and configured as white noise, pink noise or multi-sine.

Due to the configuration according to the disclosed embodiment of the insulation portion, a significant damping of the vibration transfer to the region of the actuation part located outside the actuation portion is obtained for the excitation spectrum of the excitation signal typical for haptic excitation, and thus, the haptic feedback is limited, in the maximum spectral range, to the actuation portion with its actuation surface, and outside of the latter, is accordingly damped such that the operator succeeds in haptically locating the haptic feedback in the actual actuation surface located in the visible surface. Moreover, this results in the transfer of noise into the region outside the actuation portion being minimized. Thus, the haptic feedback is not only linked in an improved manner to the location of the actuation surface but also improved on the whole.

Preferably, the electrical excitation signal intended for haptic excitation is bandwidth-limited in such a manner that its excitation spectrum, i.e., the amplitude spectrum of the excitation signal, is between 30 Hz and 1,000 Hz, preferably between 40 Hz and 600 Hz, and partially or completely includes at least the above-described frequency range. Preferably, the entire excitation spectrum of the excitation signal, or 80% thereof, or at least a majority thereof, lies within the above-mentioned frequency range. In the sense of the present disclosure, bandwidth-limited means that the excitation spectrum has a 3 dB bandwidth around a maximum. The limit frequencies are set to half the maximum, which corresponds to a lowering to around 3 dB.

Preferably, the variation of the dynamic rigidity is caused by a change in the thickness of the actuation part determined perpendicularly to the visible surface and/or a local change in the material composition of the actuation part. Preferably, this is a sudden change. A transition is understood to be sudden or discontinuous if the resulting dynamic rigidity is at least doubled or at most halved within a distance of 1 mm along the measurement section. For example, the sudden change provides for an abrupt change in the wave impedance, so that reflections into the actuation portion occur, and thus a damping during the noise transfer from the actuation portion. For example, the sudden change of the material composition and/or of the thickness of the actuation part defines the outer boundary of the actuation surface, and thus the actuation portion. For example, the thickness of the actuation portion is substantially constant, with the exception of possibly provided thickness fluctuations, such as webs or bores for attaching the actuator.

Preferably, the change in thickness is formed by a groove provided on the side of the actuation part facing away from the operator, wherein the inner wall of the groove closer to the actuation surface is the sudden change in thickness.

Preferably, the duration of the electrical excitation signal is limited to less than 100 ms, preferably less than 25 ms, in order to reduce low-frequency components in the excitation spectrum.

Preferably, the insulation portion is formed so as to extend completely around the actuation portion.

Preferably, the actuation part, at least in the actuation portion, is formed by a layer structure including at least two layers, wherein at least two layers differ with regard to the modulus of elasticity.

In this case, one layer of the layer structure preferably is a high-strength layer of a material with the greatest modulus of elasticity of the layer structure, which extends substantially parallel to the actuation surface, e.g. between the actuator and the actuation surface.

Preferably, a layer thickness of the high-strength layer is reduced in the insulation portion in order to provide the change in thickness.

Preferably, the high-strength layer is formed from a thermoplastic, such as polycarbonate or polymethyl methacrylate, in particular a fiber-reinforced thermoplastic, in order to provide the actuation portion with a comparatively high rigidity.

According to a preferred embodiment, the layer structure has a highly elastic layer of a material with the smallest modulus of elasticity of the layer structure, which, within the insulation portion, has the greatest layer thickness of all layers involved in the insulation portion, in order to provide for its flexibility.

Preferably, the highly elastic layer is formed from a thermoplastic elastomer.

Preferably, the layer structure has an additional layer for providing the change in material and the change in thickness in the insulation portion. For example, the layer includes a material with a greater acoustic damping effect than any material of the actuation part in the actuation portion.

Preferably, the actuation surface constitutes less than half, preferably less than ⅕, more preferably less than 1/10, of the visible surface of the actuation part facing towards the operator. Preferably, the actuation surface does not exceed a maximum diameter of 2 cm.

According to a preferred embodiment, several actuation portions with an associated actuator and a surrounding insulation portion are provided. Thus, the embodiment according to the present disclosure makes it possible, even for several actuation surfaces, to locate them haptically, without requiring a visual check, due to the locally limited effect of the haptic feedback, which is advantageous particularly in an application in a motor vehicle because the driver lacks the time for a visual check for most attachment locations. It is thus possible, for example, to provide the operator with the possibility of haptically locating specific actuation surfaces on the visible surface based on the haptic feedback, by individually configuring the haptic feedback with specific excitation spectra.

Furthermore, for the above-mentioned reasons, the present disclosure relates to the use of the operating member according to the present disclosure in one of its above-described embodiments in a motor vehicle.

The present disclosure is explained further with reference to the following Figures. The Figures are to be understood only as examples and each merely represents a preferred embodiment. In the Figures:

FIG. 1 shows a first embodiment of the operating member 1 according to an embodiment. It serves for performing an operating input by means of a movable actuation part 2 within the context of a man-machine interface.

Figure 1:
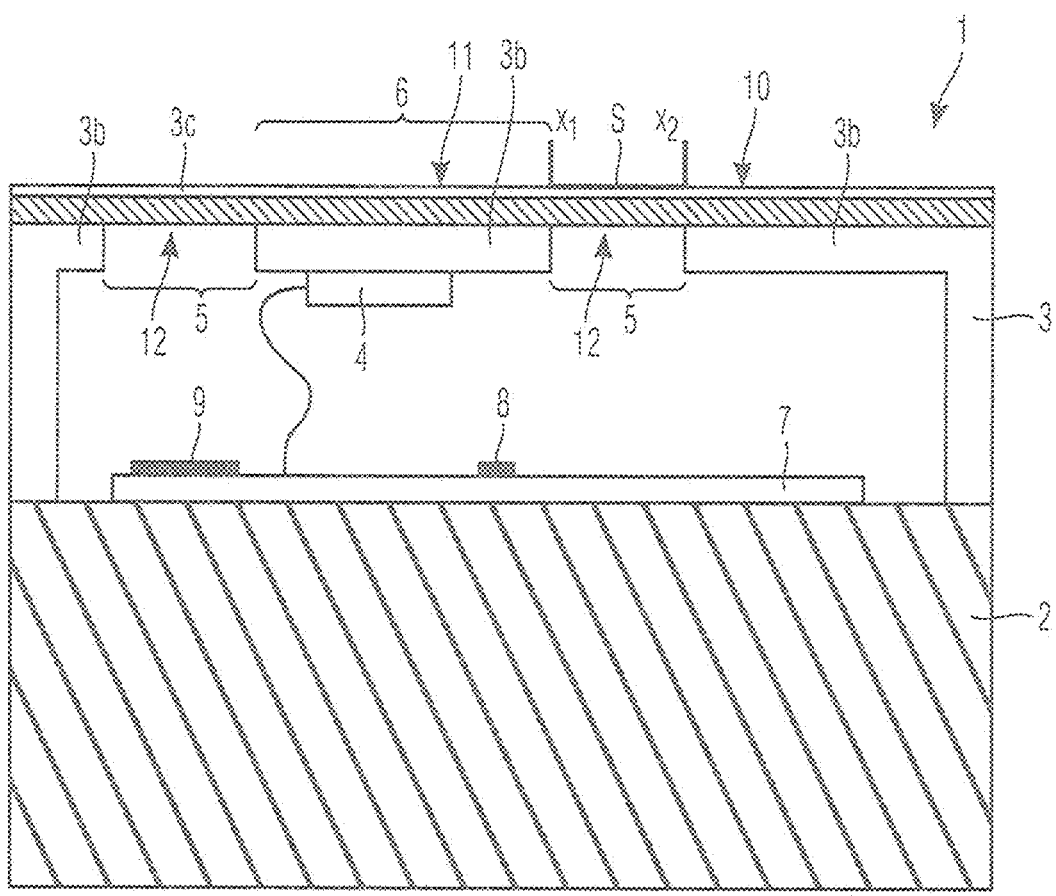
FIG. 1 shows a sectional view of an embodiment of the operating member 1 according to an embodiment.

The operating member 1 according to an embodiment includes a carrier 2. The term "carrier" is to be interpreted broadly and denotes, for instance, a component which serves for fixing the actuation part to a supporting structure or is indirectly or directly fixed, for example, to a motor vehicle component. Here, the carrier 2 is configured as a housing and, if the operating member 1 is attached as intended, not visible to the operator. The carrier 3 is formed from a plastic, a metal or a metallic alloy, such as ZAMAK, or combinations thereof, and further serves for fixing a circuit board 7, which carries thereon the detection means 8, 9 for touch or actuation detection, such as a capacitive force sensor 8 and a microprocessor 9.

The operating member 1 according to an embodiment further has an actuation part 3, which is supported on the carrier 2 and which forms a visible surface 10 facing towards an operator that forms at least one insular actuation surface 11 within the visible surface 10, wherein the actuation surface 11 is formed by a cantilevered actuation portion 6 of the actuation part 3; and the actuation portion 6 is surrounded by an insulation portion 5 of the actuation part 3, which is more flexible compared to the actuation portion 6, so that the actuation portion 6 is supported so as to be capable of vibrating relative to the carrier 2, particularly in the direction perpendicular to the actuation surface 11.

According to an embodiment, there is further provided an actuator 4 that, from the point of view of the operator, is fixed on the actuation portion 6 underneath the actuation portion 6 or on the side thereof that faces away from the operator, to which an electrical excitation signal I(t) is applied by the detection means 8, 9 in case of a positive detection of an actuation or touch, in order to excite a vibration of the actuation portion 6 for a haptic feedback. The actuator 4 is an active actuator, i.e. an actuator which can be triggered by an electrical control signal provided by detection means 8, 9, and which, due to the application of a pulse, such as an impact, or the application of a vibration to the actuation portion 6 of the actuation part 3, is capable of exciting a deflection or vibration in the latter, which is haptically perceptible by the operator via the finger resting on the actuation surface 11. For example, this haptic perception serves as a confirmation signal for an executed touch or actuation, or as a haptic acknowledgement of a switching or controlling input that was performed. Preferably, the actuator 4 is a voice coil actuator or a linear resonance actuator. In the illustrated embodiment, the actuator 4 is fixed exclusively to the actuation part 3, e.g., by screwing or gluing. Preferably, the actuation surface 11 constitutes less than half, preferably less than ⅕, more preferably less than ¹⁄₁₀, of the visible surface 10 of the actuation part 3 facing towards the operator. Preferably, the actuation surface 11 does not exceed a maximum diameter of 2 cm.

Figure 2:
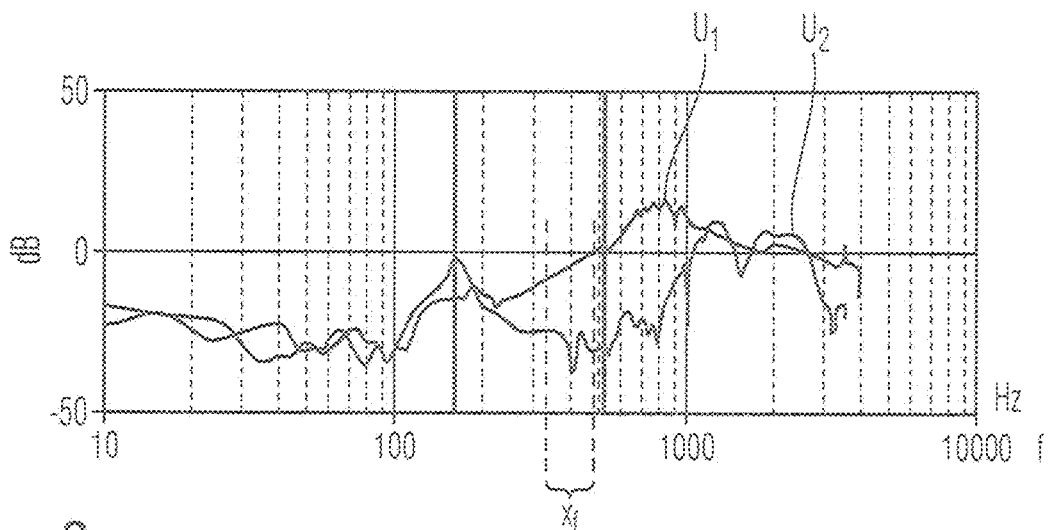
FIG. 2 shows a spectral representation of the first and second transfer functions.

Due to the structure of the actuation part 3, the dynamic rigidity, which is understood to be the local quotient of a local dynamic modulus of elasticity and the local thickness of the actuation part, varies along a measurement section s with a maximum length of 1 cm, which leads from the actuation portion 6 into or through the insulation portion 5 and is located on the visible surface 10, such that a first transfer function $U_1$ determined at a beginning $X_1$ of the measurement section s located within the actuation surface 11 differs, for a continuous frequency range between 30 Hz and 1,000 Hz, by at least 5 dB from a second transfer function $U_2$ determined at an end $X_2$ of the measurement section s located outside the actuation surface for the same frequency range, as is shown in FIG. 2. For example, the end $X_2$ is thus located beyond the insulation portion, i.e., in a part of the visible surface 10 outside the insulation surface associated with the insulation portion 5, and outside the actuation surface 11. For example, the transfer function is determined by a vibration pickup, such as a piezoelectric transducer or a laser vibrometer, for an electrical excitation signal I(t) applied to the actuator 4, which is the same in each case, bandwidth-limited to 10 Hz to 4,000 Hz, and configured as white noise, pink noise or multi-sine.

Due to the configuration according to an embodiment of the insulation portion 5, a significant damping of the vibration transfer to the region of the actuation part 3 located outside the actuation portion 6 is obtained for the excitation spectrum typical for haptic excitation, as it is labeled in FIG. 2 as $X_f$, for example, which is supposed to result from the excitation signal I(t), and thus, the haptic feedback is limited, in the maximum spectral range, to the actuation portion 6 with its actuation surface 11, and outside of the latter, is accordingly damped such that the operator succeeds in haptically locating the haptic feedback in the actual actuation surface 11 located in the visible surface 10. Moreover, this results in the transfer of noise into the region outside the actuation portion 6 being minimized. Thus, the haptic feedback is not only linked in an improved manner to the location of the actuation surface 11 but also improved on the whole.

In this case, the electrical excitation signal intended for haptic excitation is bandwidth-limited in such a manner that its excitation spectrum is between 30 Hz and 1,000 Hz, preferably between 40 Hz and 600 Hz, and partially or completely includes at least the above-described frequency range $X_f$. Preferably, the entire excitation spectrum of the excitation signal, or 80% thereof, or at least a majority thereof, lies within the above-mentioned frequency range $X_f$.

The above-mentioned variation of the dynamic rigidity is caused by a change in the thickness of the actuation part 3 determined perpendicularly to the visible surface and/or a local change in the material composition of the actuation part 3. This is a sudden change. A transition is understood to be sudden or discontinuous if the resulting dynamic rigidity is at least doubled or at most halved within a distance with a length of 1 mm along the measurement section s. In the illustrated embodiment, the change in thickness is formed by a groove 12 provided on the side of the actuation part 3 facing away from the operator, wherein the inner wall of the groove 12 closer to the actuation surface 11 is the sudden change in thickness.

Figure 3:
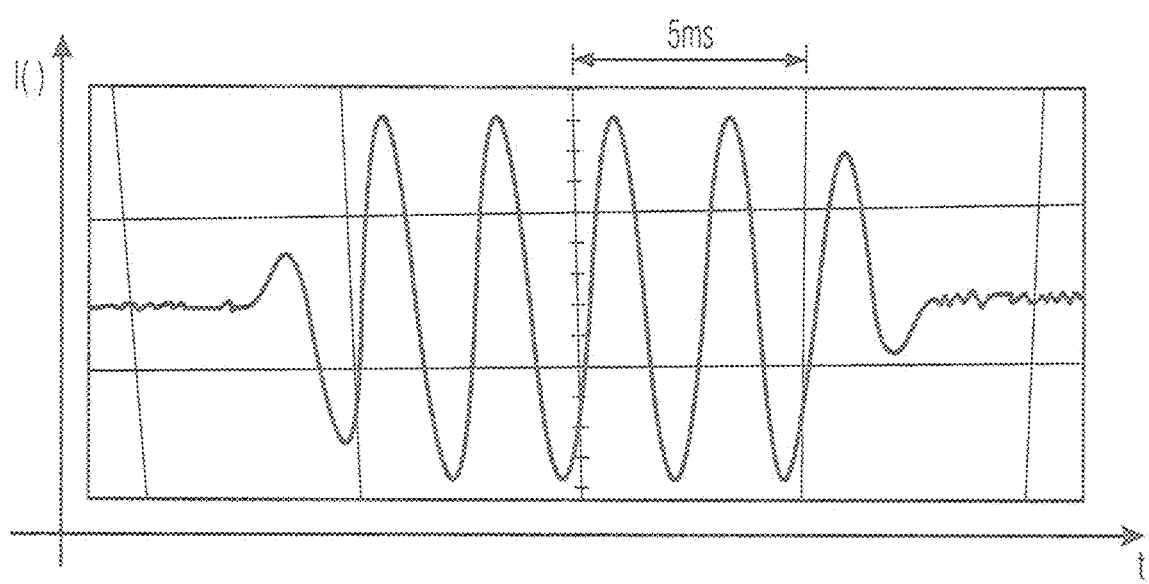
FIG. 3 shows an electrical excitation signal in a time-based representation.

As FIG. 3 shows, the duration of the electrical excitation signal is limited to less than 100 milliseconds (ms), preferably less than 25 ms, in order to reduce low-frequency components in the excitation spectrum.

As FIG. 1 shows, the actuation part 3, at least in the actuation portion, is formed by a layer structure including several layers 3a, 3b, 3c, wherein at least two layers 3a, 3b differ with regard to the modulus of elasticity.

In this case, one layer of the layer structure is a high-strength layer 3b of a material with the greatest modulus of elasticity of the layer structure, which extends substantially parallel to the actuation surface 11, here between the actuator 4 and the actuation surface 11.

Furthermore, the layer thickness of the high-strength layer 3b is reduced to zero in the insulation portion in order to provide the change in thickness mentioned above.

The high-strength layer 3b is formed from a thermoplastic, such as polycarbonate or polymethyl methacrylate, in particular a fiber-reinforced thermoplastic, in order to provide the actuation portion 6 with a comparatively high rigidity.

The layer structure further has a highly elastic layer 4a of a material with the smallest modulus of elasticity of the layer structure, which, within the insulation portion, has the greatest layer thickness of all layers 3b, 3c involved in the insulation portion 5, in order to provide for its flexibility. The layer 3c covering the entire surface area of the visible surface 10 is only a comparatively thin covering layer, such as a transparent film.

In this case, the highly elastic layer 3a is formed from a thermoplastic elastomer.

What is claimed is:

1. An operating member, comprising:
   a carrier;
   an actuation part, which is supported on the carrier and which forms a visible surface facing towards an operator that forms at least one insular actuation surface within the visible surface, wherein the actuation surface is formed by a cantilevered actuation portion of the actuation part; and the actuation portion is surrounded by an insulation portion of the actuation part, which is more flexible compared to the actuation portion, so that the actuation portion is supported so as to be capable of vibrating relative to the carrier;
   detection means for detecting a touch on the actuation surface and/or an actuation of the actuation part;
   an actuator fixed on the actuation portion of the actuation part on the side that, from the point of view of the operator, faces away from the operator, to which an electrical excitation signal is applied by the detection means in case of a positive detection of an actuation or touch, in order to excite a vibration of the actuation portion for a haptic feedback; and
   wherein a dynamic rigidity of the actuation part determined along a measurement section with a maximum length of 1 cm, leading from the actuation portion in or through the insulation portion and located on the visible surface, varies such that a first transfer function determined at a beginning of the measurement section differs, for a continuous frequency range between 30 Hz and 1,000 Hz, by at least 5 dB from a second transfer function determined at an end of the measurement section for the same frequency range.

2. The operating member according to claim 1, wherein the electrical excitation signal has an excitation spectrum between 30 Hz and 1,000 Hz which at least partially includes the frequency range.

3. The operating member according to claim 1, wherein the variation of the dynamic rigidity is caused by a change in the thickness determined perpendicularly to the visible surface and/or a change in the material composition of the actuation part.

4. The operating member according to claim 3, wherein the change in thickness is formed by a groove provided on the side of the actuation part facing away from the operator.

5. The operating member according to claim 1, wherein a duration of the electrical excitation signal is limited to less than 100 ms.

6. The operating member according to claim 1, wherein the insulation portion is formed so as to extend completely around the actuation portion.

7. The operating member according to claim 1, wherein the actuation part, at least in the actuation portion, is formed by a layer structure including at least two layers, wherein at least two layers differ with regard to the modulus of elasticity.

8. The operating member according to claim 7, wherein one layer of the layer structure is a high-strength layer of a material with the greatest modulus of elasticity of the layer structure, which extends substantially parallel to the actuation surface.

9. The operating member according to claim 8, wherein a layer thickness of the high-strength layer is reduced in the insulation portion in order to provide the change in thickness.

10. The operating member according to claim 8, wherein the high-strength layer is formed from a thermoplastic.

11. The operating member according to claim 7, wherein the layer structure has a highly elastic layer of a material with the smallest modulus of elasticity of the layer structure, which, within the insulation portion, has the greatest layer thickness of all layers involved in the insulation portion.

12. The operating member according to claim 11, wherein the highly elastic layer is formed from a thermoplastic elastomer.

13. The operating member according to claim 7, wherein the layer structure has an additional layer for providing the change in material and the change in thickness.

14. The operating member according to claim 1, wherein the actuator is supported exclusively on the actuation part.

15. The operating member according to claim 1, wherein the actuation surface constitutes less than half of a visible surface of the actuation part facing towards the operator.

16. The operating member according to claim 1, wherein several actuation portions with an associated actuator and a surrounding insulation portion are provided.

17. The operating member according to claim 1, wherein the actuation surface does not exceed a maximum diameter of 2 cm.

18. Use of the operating member according to claim 1, in a motor vehicle.

19. The operating member according to claim 3, wherein the change in the thickness is a sudden change.

20. The operating member according to claim 10, wherein the thermoplastic is any one of: a polycarbonate, a polymethyl methacrylate, and a fiber-reinforced thermoplastic.

* * * * *